(12) United States Patent
McConnell et al.

(10) Patent No.: US 8,150,011 B2
(45) Date of Patent: Apr. 3, 2012

(54) APPARATUS, METHOD, AND COMPUTER PROGRAM PRODUCT FOR GEOGRAPHIC CALL CENTER STATUS AND SECURITY

(75) Inventors: James T. McConnell, North Richland Hills, TX (US); Charles V. Miller, IV, Hayes, VA (US); Roy D. Barrett, Hampton, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1013 days.

(21) Appl. No.: 11/954,764

(22) Filed: Dec. 12, 2007

(65) Prior Publication Data

US 2009/0154685 A1    Jun. 18, 2009

(51) Int. Cl.
*H04M 1/56* (2006.01)
*H04M 15/06* (2006.01)

(52) U.S. Cl. .......... 379/142.1; 379/207.12; 379/207.15; 379/265.01; 379/309

(58) Field of Classification Search ............... 379/142.1, 379/207.22, 207.15, 265.01, 309
See application file for complete search history.

(56) References Cited

U.S. PATENT DOCUMENTS

| | | | |
|---|---|---|---|
| 7,929,685 B1 * | 4/2011 | Boyet et al. | 379/265.02 |
| 2003/0013461 A1 * | 1/2003 | Mizune et al. | 455/456 |
| 2004/0001580 A1 * | 1/2004 | Mason | 379/207.04 |
| 2007/0296581 A1 * | 12/2007 | Schnee et al. | 340/572.1 |
| 2008/0232571 A1 * | 9/2008 | Millard et al. | 379/207.12 |
| 2008/0235231 A1 * | 9/2008 | Gass et al. | 707/9 |

* cited by examiner

*Primary Examiner* — Quynh Nguyen (57) ABSTRACT

An apparatus, method, system, and computer program product are provided for producing a geographical mapping of the status, activity, security, work-force, and other information of call centers. The systems and methods may receive call center data and call data, generate a geographical data, and display at least a portion of the geographical data.

20 Claims, 12 Drawing Sheets

APPARATUS, METHOD, AND COMPUTER PROGRAM PRODUCT FOR GEOGRAPHIC CALL CENTER STATUS AND SECURITY

BACKGROUND

For many companies, call centers are becoming a globally delivered resource. These call centers usually rely on computer and telephone systems to provide the status, activity, security, work-force, and other information of each call center. In providing this functionality, the computer and telephone systems typically only display a textual view of the information. Thus, a need exists to provide a geographical representation of the status, activity, security, work-force, and other information of call centers.

DETAILED DESCRIPTION

Exemplary embodiments are described hereinafter with reference to the accompanying drawings, in which exemplary embodiments and examples are shown. Like numbers refer to like elements throughout.

As should be appreciated, the exemplary embodiments may be implemented as methods, apparatus, systems, or computer program products. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

The exemplary embodiments are described below with reference to block diagrams and flowchart illustrations of methods, apparatus, systems, and computer program products. It should be understood that each block of the block diagrams and flowchart illustrations, respectively, can be implemented by computer program instructions, e.g., as logical steps. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
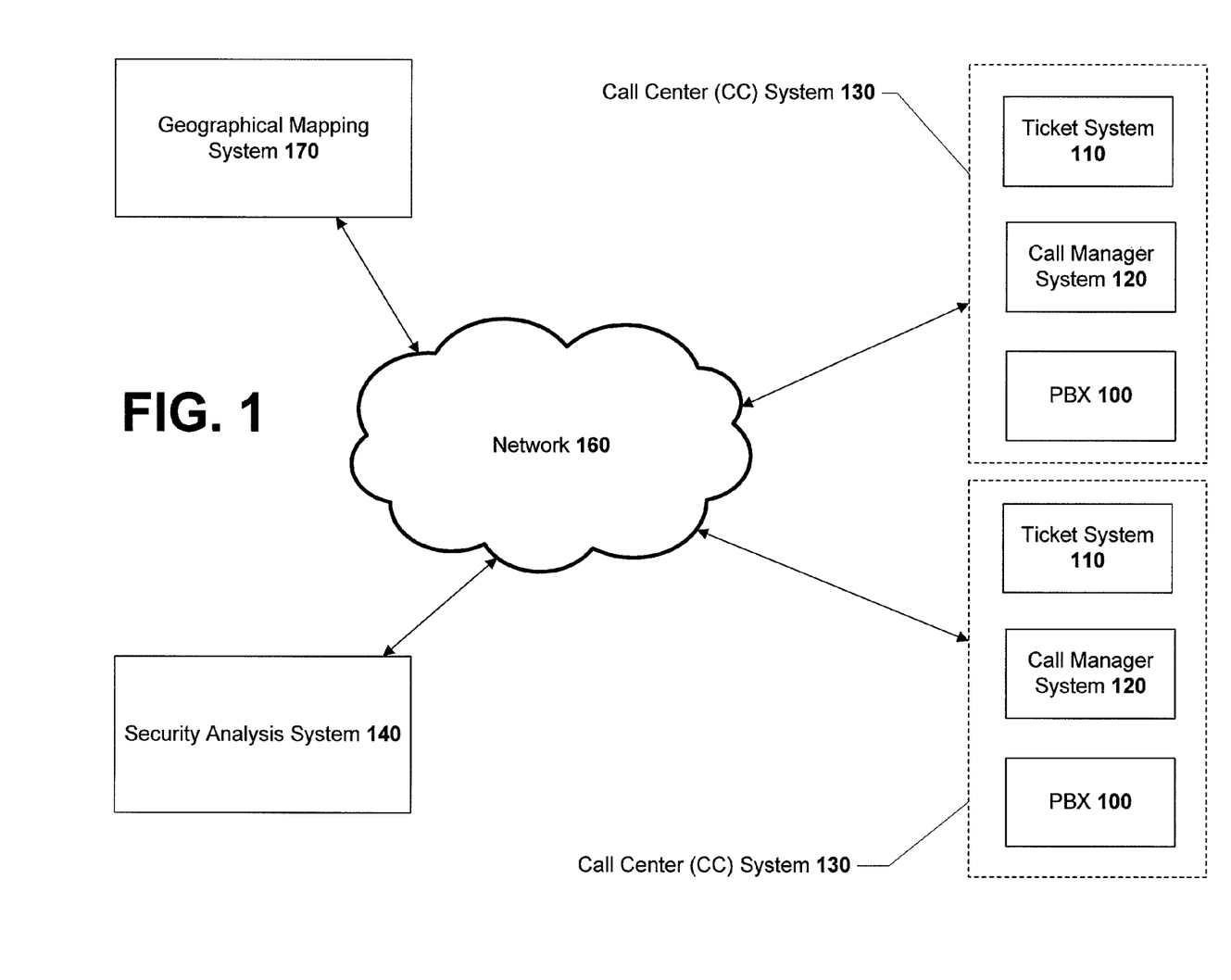
FIGS. 1, 2, 3, and 4 show various embodiments of a geographical mapping system.

FIG. 1 shows a geographical mapping system 170 according to an exemplary embodiment. The phrase "geographical mapping system" is used generically to refer to any computer (including mainframes, desktops, notebooks or laptops), distributed system, gateway, router, server, hub, switch, repeater, or any other processing device configured to perform the functions described herein. As will be understood from FIG. 1, in this embodiment, the geographical mapping system 170 is connected to one or more networks 160 (e.g., connected via a local area network (LAN), metropolitan area network (MAN), wide area network (WAN), the Internet, or private network) to communicate with other computing entities, such as a security analysis system 140 and a call center system 130. This communication is typically executed using a wired data transmission protocol such as X.25, ISDN, DSL, PIP, Ethernet, ATM, frame relay, DOCSIS, or any other wired transmission protocol. Similarly, the geographical mapping system 170 may be configured to communicate via wireless external communication networks using any of a variety of wireless protocols. As also indicated in FIG. 1, the geographical mapping system 170 may be embodied in a distributed computing system. That is, the geographical mapping system 170 may be located remotely from the security analysis system 140 and the call center system 130.

Figure 2:
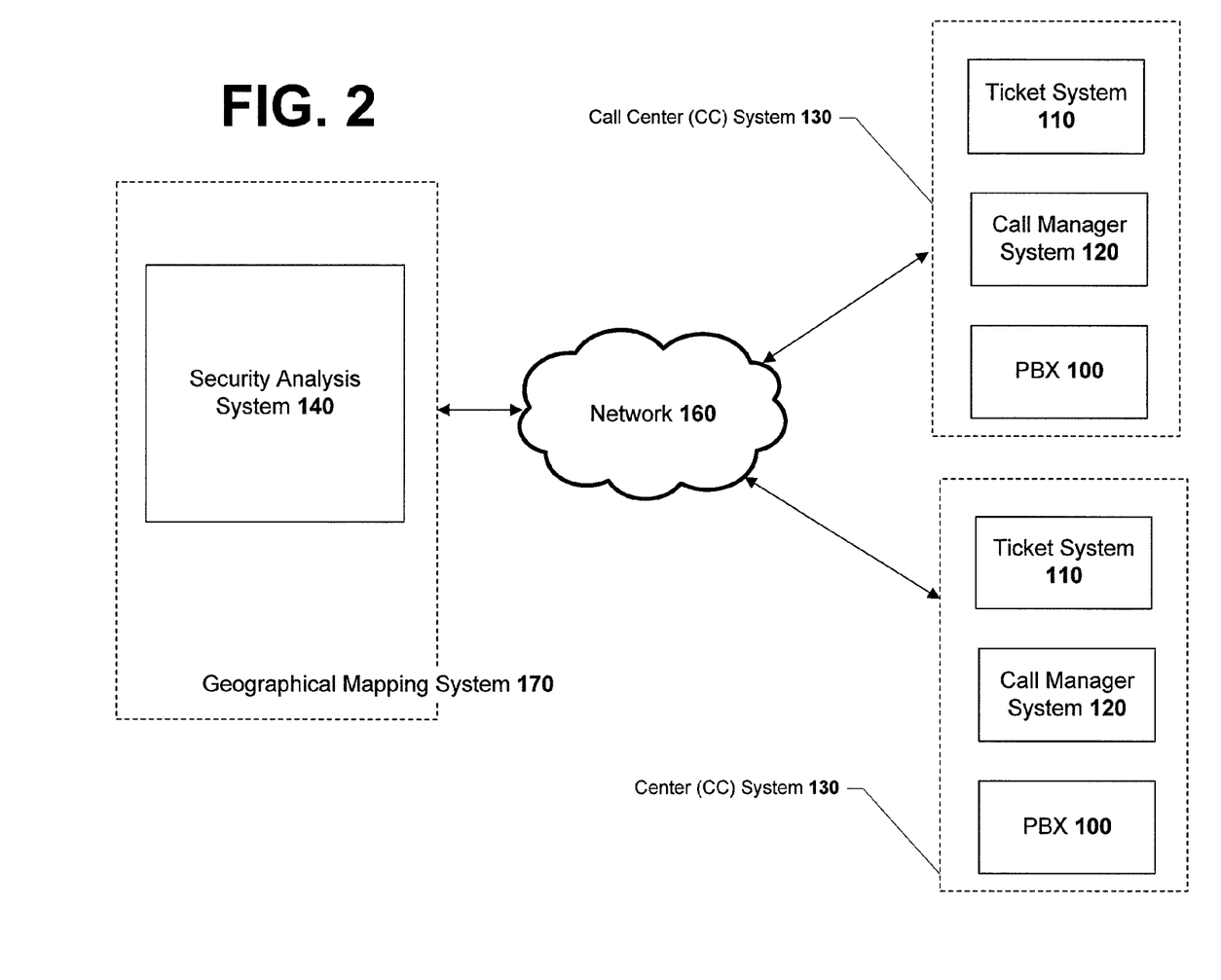
Figure 3:
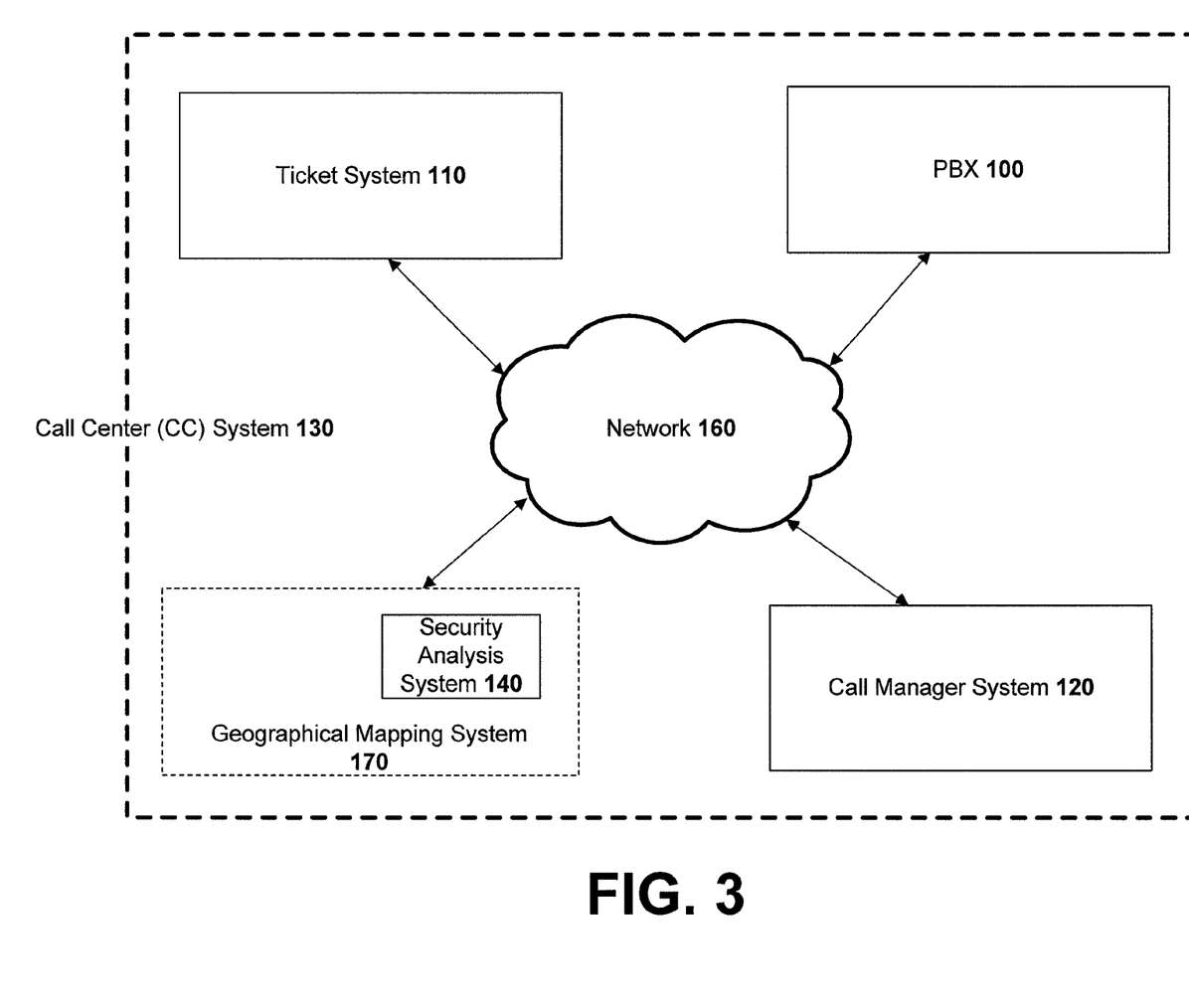

Alternatively, in another embodiment (shown in FIG. 2), the security analysis system 140 may reside on the same computer system as the geographical mapping system 170 and communicate with it via a network, system interface, or bus. In these embodiments, the geographical mapping system 170 may be located remotely from the call center system 130 (as shown in FIG. 2) or it may reside on the same system as the call center system 130 (as shown in FIG. 3). In yet another embodiment (shown in FIG. 4), the geographical mapping system 170 may implement the functionality described herein via modules, e.g., a mapping module 405 and a security module 410. As will be recognized, though, the architectures described are exemplary and not limiting to the various embodiments.

Figure 4:
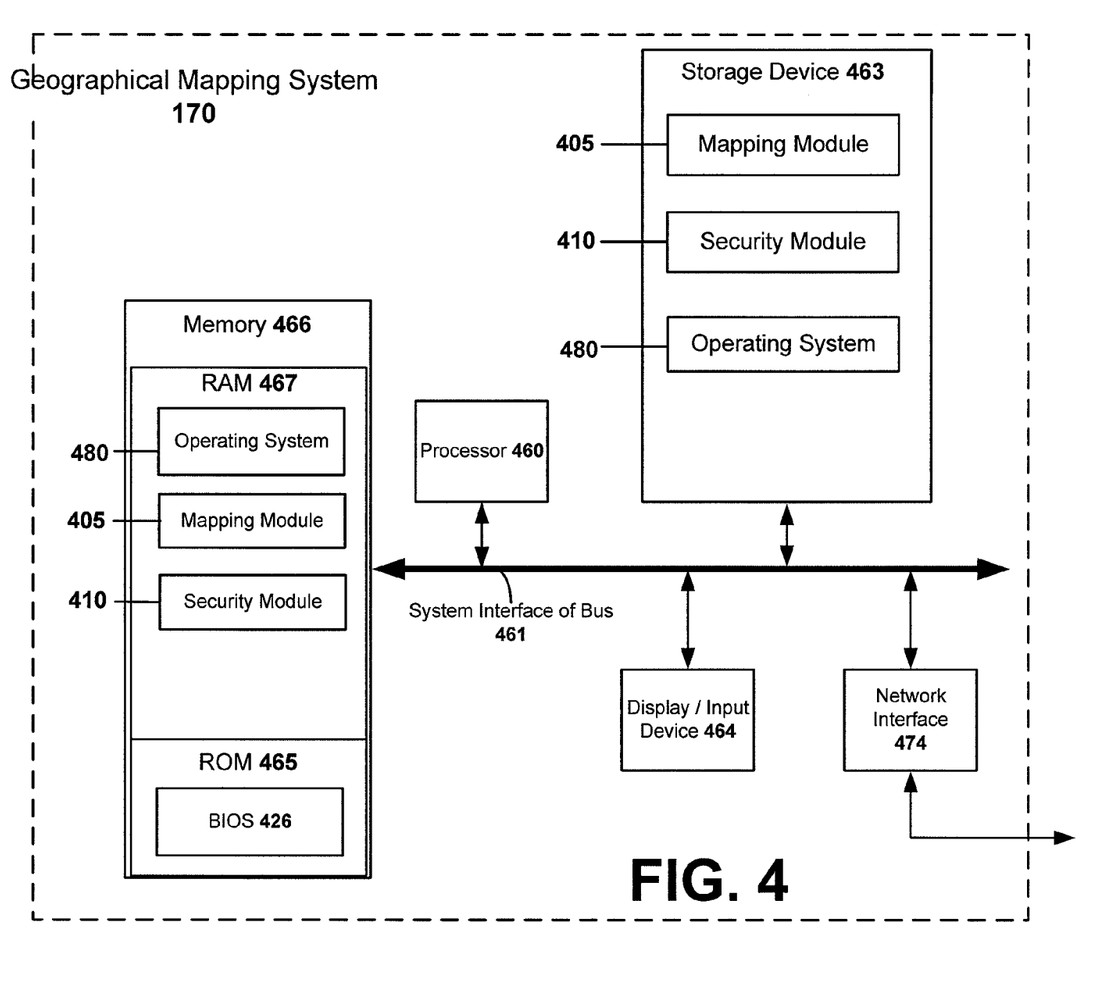

As mentioned, FIG. 4 shows one embodiment of the geographical mapping system 170 implementing the described functionality as modules. As will be understood from this figure, in this embodiment, the geographical mapping system 170 includes a processor 460 that communicates with other elements within the geographical mapping system 170 via a system interface or bus 461. The geographical mapping system 170 also includes a display/input device 464 for receiving and displaying data. This display/input device 464 may be, for example, a keyboard or pointing device used in combination with a monitor. The geographical mapping system 170 further includes memory 466, which may include both read only memory (ROM) 465 and random access memory (RAM) 467. The ROM 465 is used to store a basic input/output system 426 (BIOS), containing the basic routines that help to transfer information between elements within the geographical mapping system 170.

In addition, the geographical mapping system 170 may include a storage device 463, such as a hard disk drive, a floppy disk drive, a CD ROM drive, or an optical disk drive, for storing information on various computer-readable media, such as a hard disk, a removable magnetic disk, or a CD-ROM disk. As will be appreciated, each of these storage devices 463 may be connected to the system bus 461 by an appropriate interface. The storage devices 463 and their associated computer-readable media provide nonvolatile storage. The computer-readable media described above could be replaced by any other type of computer-readable media, e.g., magnetic cassettes, flash memory cards, digital video disks, and Bernoulli cartridges.

A number of program modules may be stored by the various storage devices and within RAM 467. Such program modules may include an operating system 480, a mapping module 405, and a security module 410. The mapping module 405 and the security module 410 control certain aspects of the operation of the geographical mapping system 170, with the assistance of the processor 460 and operating system 480.

Also located within the geographical mapping system 170 is a network interface 474 for interfacing and communicating with other elements of a computer network. It will be appreciated that one or more of the geographical mapping system 170 components may be located remotely from other geographical mapping system 170 components. Furthermore, one or more of the components may be combined, and additional components performing functions described herein may be included in the geographical mapping system 170.

In general, exemplary embodiments described herein provide apparatus, systems, methods, and computer program products for providing a geographical representation, geographical display, or geographical mapping (the terms are used interchangeably) of the status, activity, security, workforce, and other information of call centers. Embodiments of a geographical mapping system 170 performing various functions are described below. In one embodiment shown in FIG. 4, for example, the processor 460 of the geographical mapping system 170 will generally perform or direct performance of the various functions, based upon execution of computer instructions stored in memory 466. As previously mentioned, the geographical mapping system 170 may be executed via a distributed computer system, as separate modules within a system, or as separate systems. Accordingly, the geographical mapping system 170 may be located within a particular call center, located at a central location, or integrated into a call center's system, such as in call center system 130. The phrase "call center system" is used generically to refer to the various systems used by call centers to receive and/or transmit information about customers, customers' accounts, and other information and/or to route calls from customers to appropriate call centers.

Figure 5:
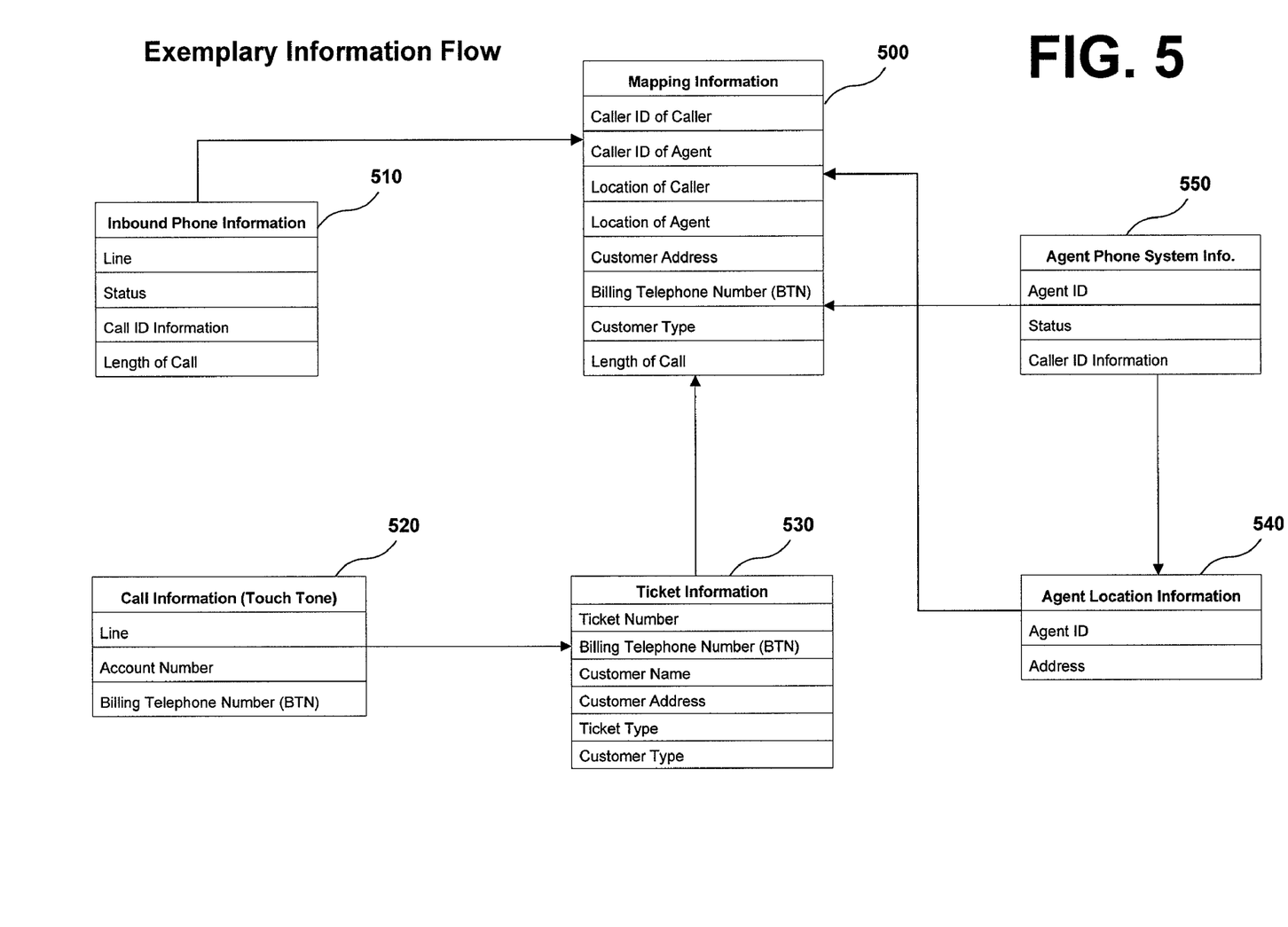
FIG. 5 shows an exemplary information flow directed to a geographical mapping system according to one embodiment.

A call center system 130 may include a private branch exchange ("PBX 100"), a ticket system 110, and a call manager system 120. Typically, the call center system 130 can provide the geographical mapping system 170 with mapping information 500 such that the geographical mapping system 170 can display a geographical mapping of the call center information. The PBX 100, the ticket system 110, and the call manager system 120 are exemplary components of a call center system 130 that can provide information to the geographical mapping system 170, but are not limiting to the various embodiments. The various components that comprise the call center system 130 provide information (as shown in FIG. 5) used by the geographical mapping system 170. The geographical mapping system 170 uses the mapping information 500 to generate and display geographical data.

Figure 6:
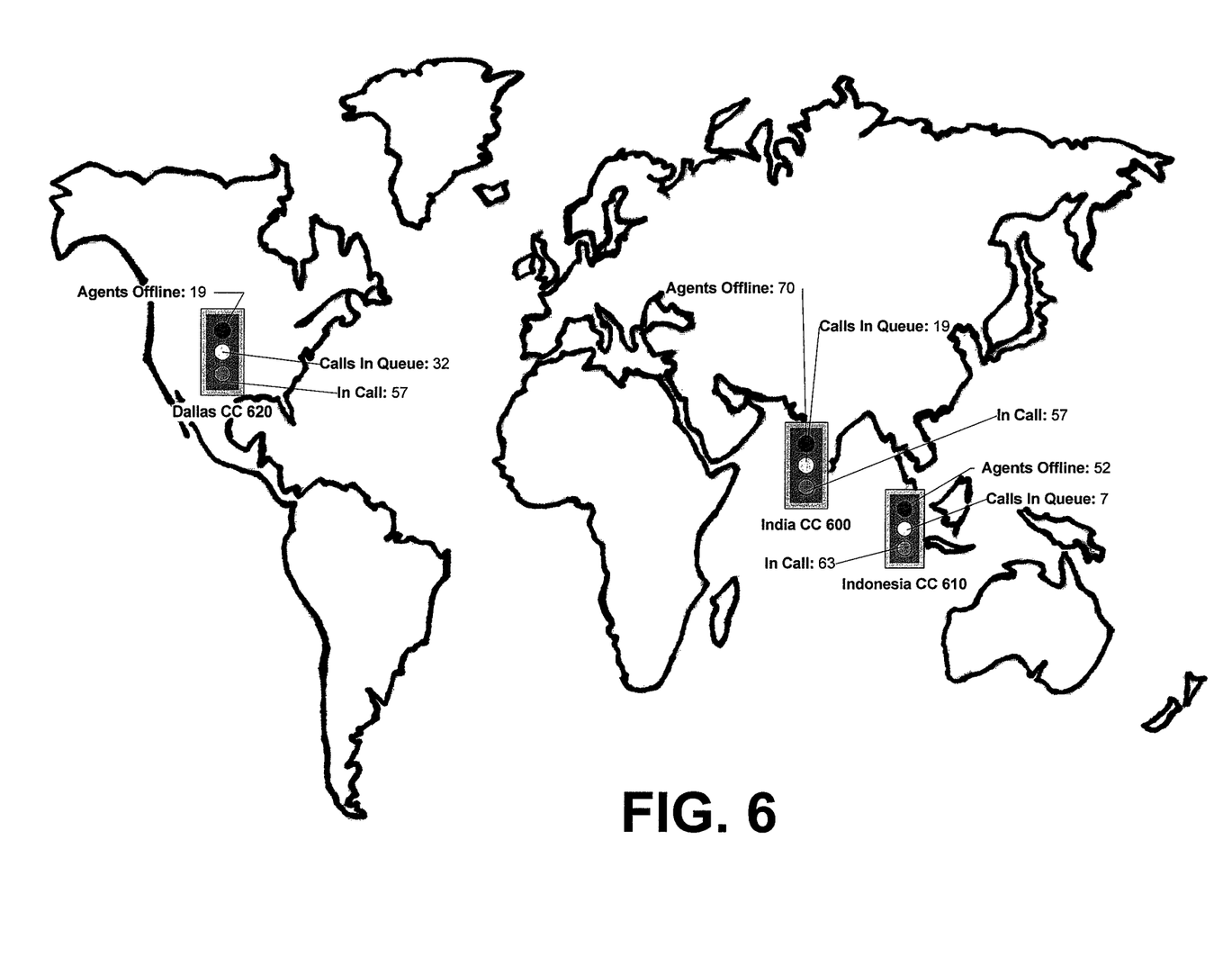
FIGS. 6, 7, 8, 9, and 10 show exemplary outputs from a geographical mapping system according to one embodiment.

Geographical data typically includes a geographic representation of the status, activity, security, work-force, and/or other information of call centers, for instance, as shown in FIG. 6. The geographical data can also include data associating the geographic locations of the callers in relation to the call centers (referred as a "geographic mapping"), such as the respective global positioning system coordinates, longitude and latitude coordinates, address information, local access and transport area ("LATA") information, or the like. Additionally, the geographical data can also comprise other information directly from or generated from the mapping information 500, including the telephone number of the call, the length of the call, the location of the caller, the caller's account number, the location of the agent, location of the call center, the agents online, the agents offline, length of the call, or the like (as shown, for example, in FIG. 8).

Mapping information 500 can be categorized as call data and call center data. Call data can refer to mapping information 500 or other information relating to the caller calling the call center, such as the telephone number, the location of the caller, the caller's account number, or the like. Call center data can refer to mapping information 500 or other information relating to one or more call centers, such as call center locations, agent location, the agents online, call status information, the agents offline, or the like. As mentioned, the terms call data and call center data can be referred to generically as mapping information 500 to indicate call data, call center data, or both.

The mapping information 500 (e.g., call data and/or call center data) can be received from the caller or the various systems of the call center system 130. For example, in one embodiment, the mapping information 500 can be the inbound telephone call information 510 or from information relating to a specific call center, which can be used to indicate the line of the call, status of the call (e.g., on hold, in call, or in queue), length of the call, the caller's account number, and origination information. In one embodiment some of the mapping information 500 can be automatically obtained using a caller identification ("ID") technology (e.g., phone number, city and state associated with the phone number, and name of the person to whom the phone number is registered). The mapping information 500 may also be automatically communicated to the geographical mapping system 170 by the call center system 130, received in response to queries by the geographical mapping system 170, or both. For example, the PBX 100, ticket system 110, or call manager system 120 may be used to provide additional call information 520 collected via a touch-tone system, such as the customer's billing telephone number or account number. Similarly, the ticket system 110 can provide ticket information 530, such as the ticket number or ticket type for a particular issue or call, the customer's billing telephone number, the customer's name, the customer's address, and the customer type. The call manager system 120 can provide information regarding the customer service agent ("agent") handling the call, such as the agent location information 540 or agent phone system information 550. The agent location information 540 or agent phone system information 550 may include the agent's identification number, agent's address, status of the call, and call origination information using a caller ID technology (e.g., phone number and city and state associated with the phone number).

Figure 7:
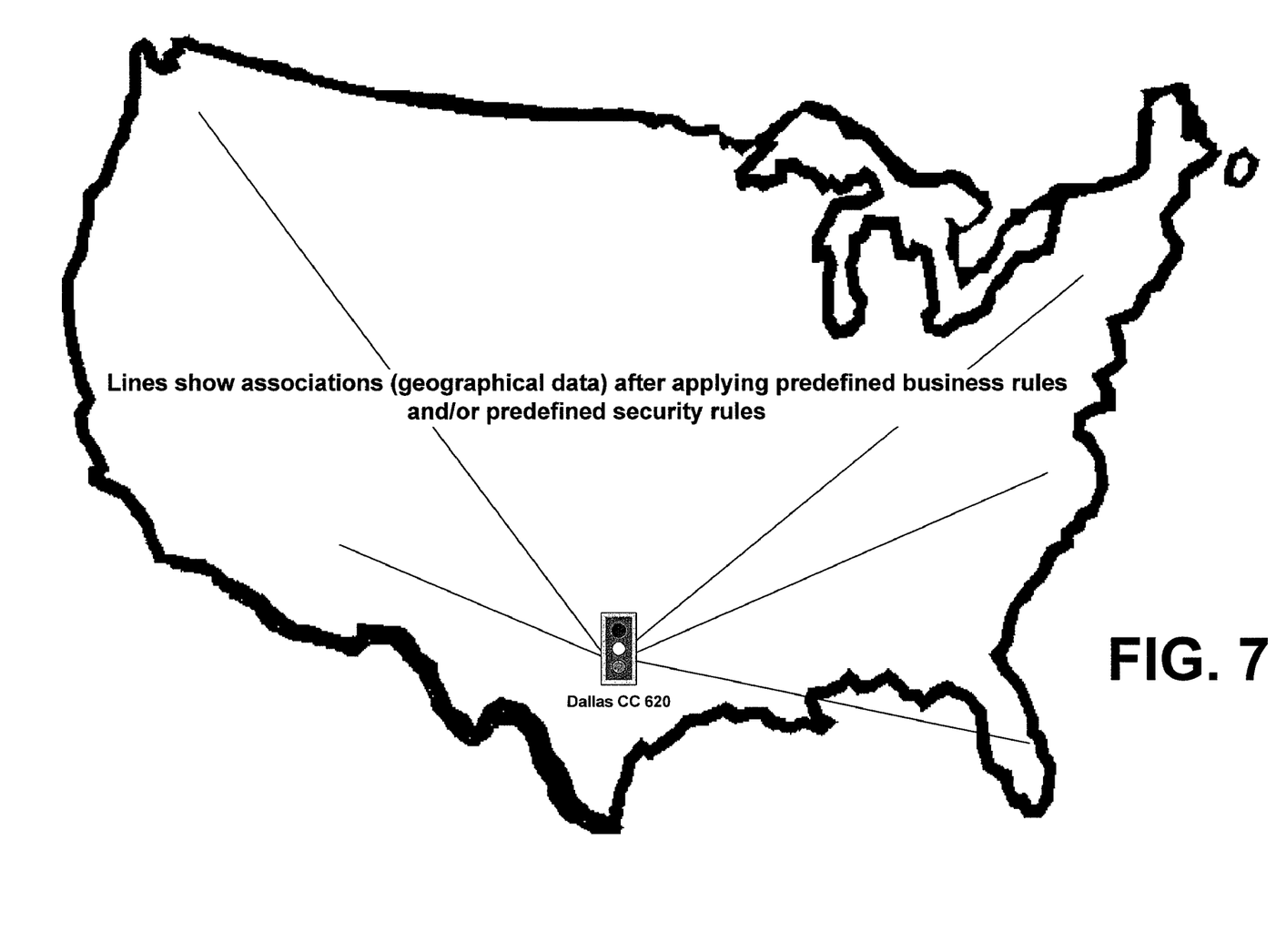
Figure 8:
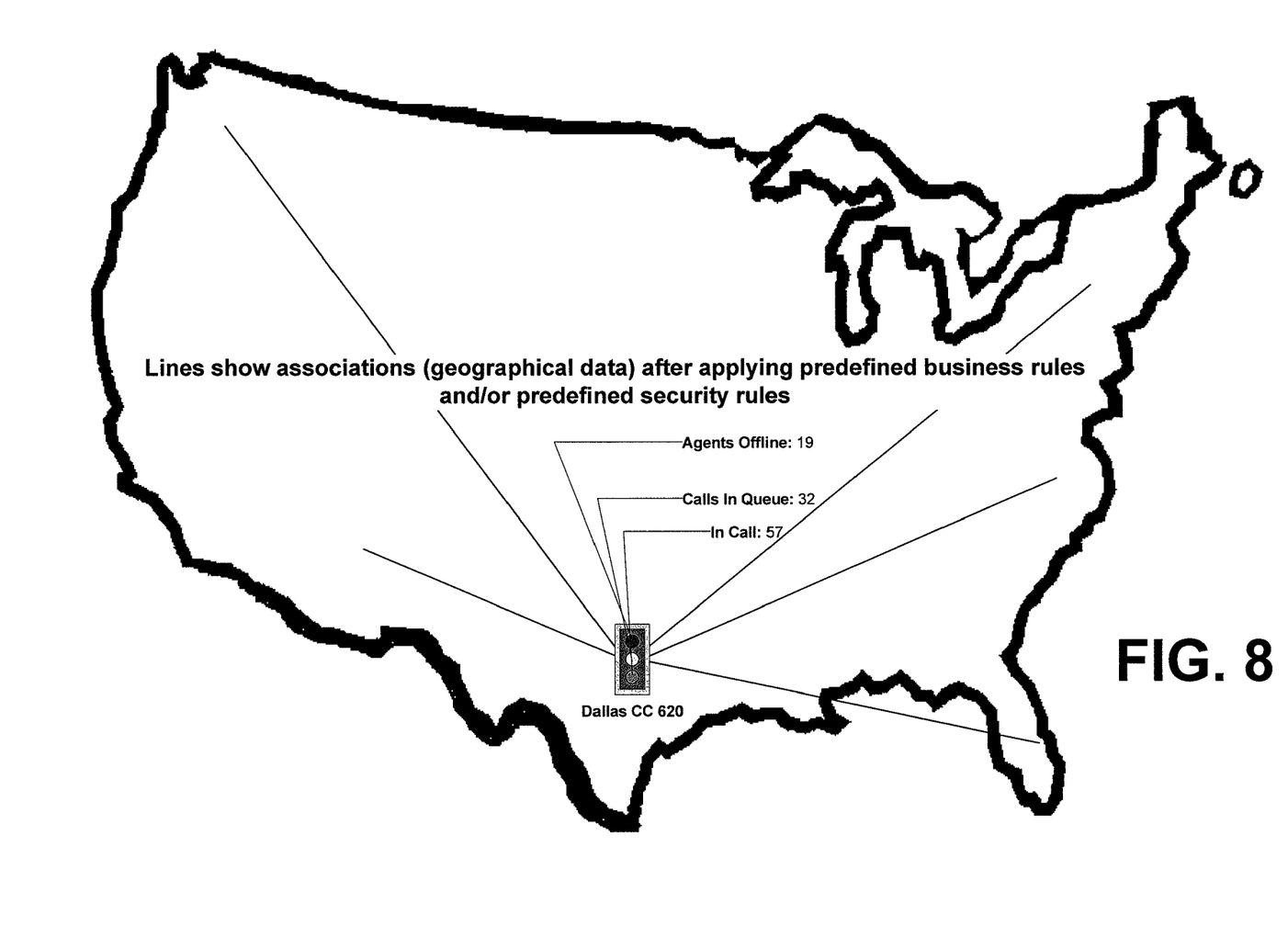

The caller (e.g., providing call data via a caller ID technology) and/or the various components of the call center system 130 provide mapping information 500 to the geographical mapping system 170. The mapping information 500 can be used to generate geographical data, which can include a geographical mapping (data associating the geographic locations of the callers in relation to the call centers). For example, the Dallas call center 620 can be represented by a stoplight. The stoplight (or any other graphic representing the call center) is typically proximate to the geographical location of a given call center as illustrated by the Dallas call center 620, India call center 600, and Indonesia call center 610. In conjunction with the stoplight or other graphic, the geographical mapping system 170 can display various types of call center information (e.g., geographical data), such as the number of calls in queue, the number of agents offline, the number of agents online, the number of customers in call, the number of calls in queue for over five minutes, or any other information related to the call centers or customers. Moreover, the displayed information for a call center can be at a very high level or low level, e.g., the displayed information can be at the call center level, the group-level (a group within a call center), or the agent level (information regarding a particular agent). Similarly, the displayed information for a given call can be general such as a line from a call center to a call origination location as shown in FIGS. 7-8 or it may include detailed call information as indicated by the text in FIG. 10.

As mentioned, the geographical mapping system 170 can generate a geographical mapping of the location of the call center (e.g., Dallas call center 620) and its relation to the call origination location of a given call. In FIGS. 7 and 8, the associations among the Dallas call center 620 and the call origination locations are indicated by lines between the respective locations. The geographical mapping system 170 may be configured to display a line for every active call at a call center, such as from the Dallas call center 620, or be configured to display a line for calls complying or failing to comply with predefined rules, i.e., it can filter the calls and/or geographical data. To filter the calls and/or the geographical data, the geographical mapping system 170 and the security analysis system 140 may apply predefined business rules and/or predefined security rules, respectively. The terms predefined business rules and predefined security rules are used generically to refer to any set(s) of rules, protocols, filtering procedures, or the like that are used to determine whether some or all of the information being analyzed should generate an alert, be displayed to the user (and/or how it should be displayed), be tracked for additional information, or the like. In one embodiment, the predefined business rules and predefined security rules function in accordance with a top-down principle such that if the information being analyzed complies with the first rule, it will not be analyzed for comparison with the remainder of the rules. In another embodiment, the information being analyzed can be compared to all rules, a subset of rules, or the like. It should be noted that irrespective of the approach used, the predefined business rules and predefined security rules are used to analyze information, such as the mapping information 500.

Thus, each system (the geographical mapping system 170 and/or the security analysis system 140) can be configured to filter calls and/or geographical data for compliance with both the predefined business rules and the predefined security rules. Or, the filtering may be executed by modules, such as the mapping module 405 and the security module 410. The predefined business rules and the predefined security rules may be comprised of various subsets of rules, respectively. Additionally, the predefined business rules may be wholly distinct from the predefined security rules, overlap one another, or be comprised of the same rules. Moreover, the sets and subsets of the respective predefined business rules and the predefined security rules may be wholly distinct from one another, overlap, or be comprised of the same rules. However, the rules that comprise each rule set or subset are not limiting to the various embodiments.

In one embodiment, the subsets of rules may apply to, for example, different call center locations, different customer types, or different call origination locations. Illustratively, the predefined business rules may be designed to filter calls such that the geographical mapping system 170 only displays calls that have been in the queue for over five minutes or calls that are assigned a specific ticket code. By filtering calls by ticket code, the geographical mapping system 170 could help determine if trouble calls originate from a particular region, state, or city. Similar to filtering according to predefined business rules, the predefined security rules may be designed to filter calls or geographical data such that the geographical mapping system 170 only displays calls and/or geographical data violating certain security policies. The predefined security rules may be designed to locate potential security threats. For instance, if a customer lives in Orlando, Fla., but the customer service call for the account originates in Seattle, Wash., the geographical mapping system 170 may display the geographical data (e.g., the geographical mapping) of the call if it violates the predefined security rules or the predefined business rules. This exemplary rule may be implemented because a customer typically calls from her city of residence when placing a call to customer service. In short, the predefined business rules and predefined security rules can be configured to filter calls and/or geographical data according to any predefined business and/or security policy.

As discussed, there can be various sets and subsets of predefined business rules and/or predefined security rules. The sets and subsets can be used by the geographical mapping system 170 not only to filter the calls or geographical data, but also to define the display characteristics corresponding to each call. For example, the color of the line from the call center to the respective call origination locations may be used to indicate alert levels. That is, after filtering a call, calls, or geographical data for compliance with the predefined security rules, a different color can be assigned for each respective alert level. In one embodiment, the color of each line with its corresponding alert level may define the danger of the threat: green line=low alert level; blue line=moderate alert level; yellow line=elevated alert level; orange line=high alert level; and a red line=severe alert level. In addition to colored lines, the geographical mapping system 170 may generate alerts as required by the predefined business rules or predefined security rules. For example, all calls deemed to be at a high alert level or above may cause the geographical mapping system 170 to generate an alert. The alert generated can be a textual notice to a computer, pager, cell phone, or other mobile device to notify a user. Similarly, the geographical mapping system 170 may also generate an audible alert or cause the displayed line from the call center to the call origination location associated with a given call to flash. The alerts generated by the geographical mapping system 170 may be for violations of the predefined business rules, the predefined security rules, or both. As will be recognized, the preceding alerts and alert levels are exemplary and not limiting to the various embodiments.

Furthermore, the alerts can be generated using a single predefined rule set or multiple predefined rule sets. In one embodiment, determining if the geographical mapping system 170 should generate an alert is performed simultaneously with the filtering. In another embodiment, it is performed after the geographical mapping system 170 filters the calls or geographical data. For example, the geographical mapping system 170 may filter the calls or geographical data according to a first predefined rule set, and then determine if any of the filtered calls or geographical data require that the geographical mapping system 170 generate an alert according to a second predefined rule set. In another embodiment, the geographical mapping system 170 filters the calls or geographical data and simultaneously determines if each respective call or geographical data set requires it to generate an alert according to a single predefined rule set.

Figure 9:
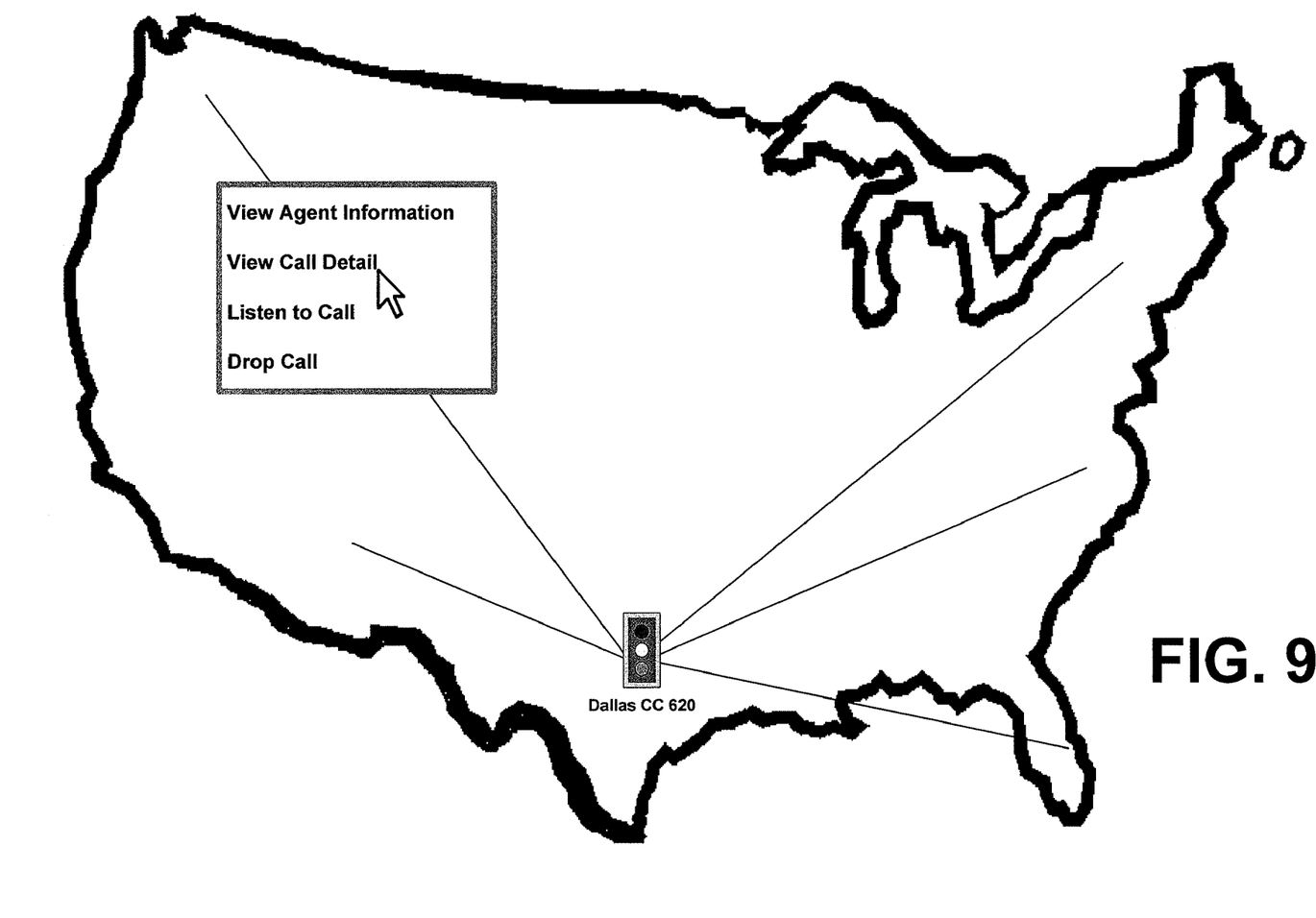
Figure 10:
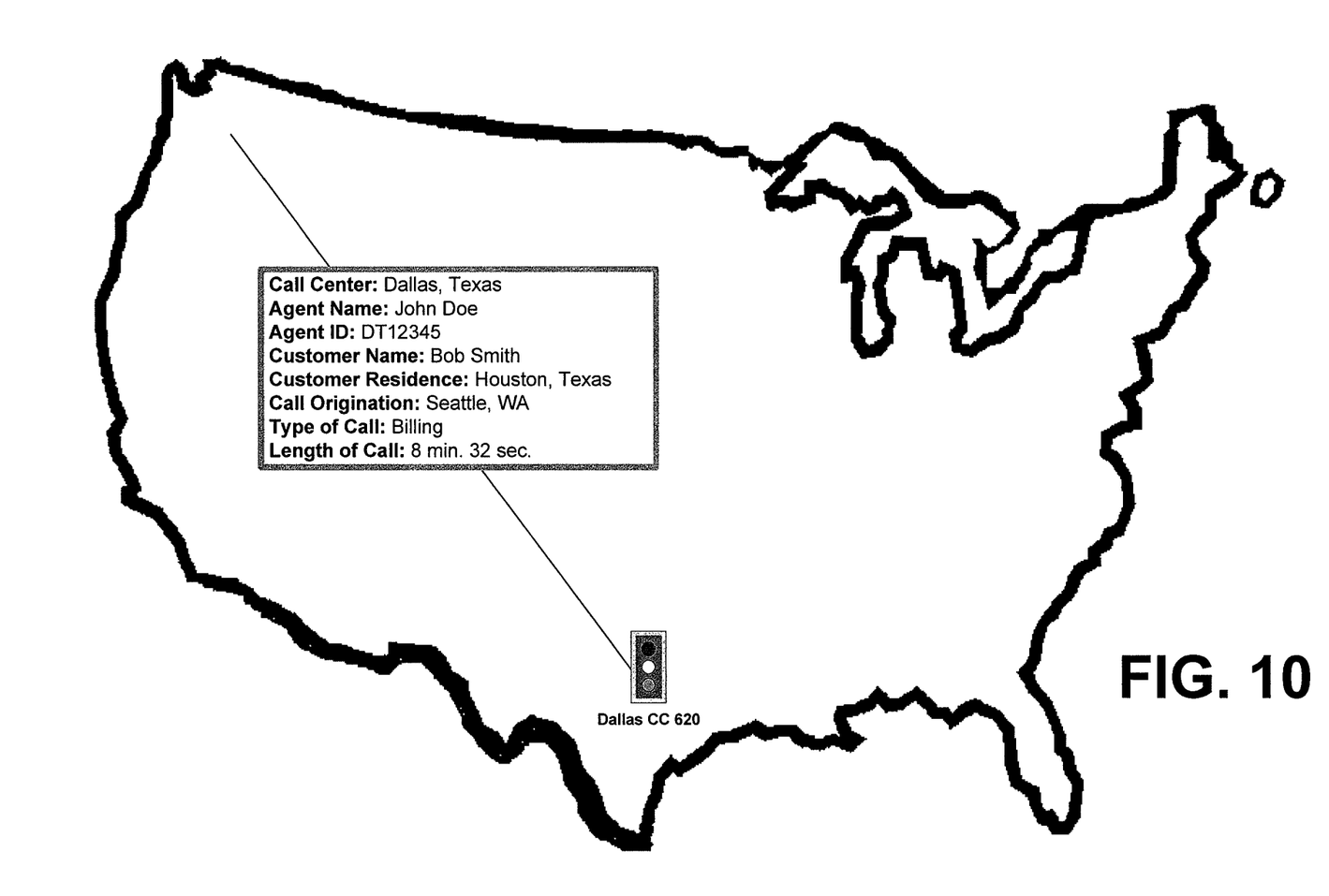

In addition to providing alerts, the geographical mapping system 170 can also be used to invoke further capabilities. That is, additional options and information may be available, for instance, by scrolling over, clicking on, or touching a given line (collectively referred to as activating a line). In one embodiment, by activating a line, the geographical mapping system 170 may generate a pop-up window with additional options. As shown in FIG. 9, by activating the line, the user is provided with the options of viewing agent information, viewing call detail, listening to the call, or dropping the call. Various information and options can be provided by the geographical mapping system 170 through activating a line. For example, by selecting "View Call Detail" from the pop-up window as illustrated in FIG. 9, additional call information can be displayed as shown in FIG. 10. In this embodiment, the additional call detail includes 1) the name of the call center, 2) name of the agent, 3) agent ID, 4) customer's name, 5) customer's residence, 6) call origination location, 7) type of call, and 8) length of call. As will be understood, though, the options and information available by activating a line are exemplary and not limiting to the various embodiments.

Figure 11:
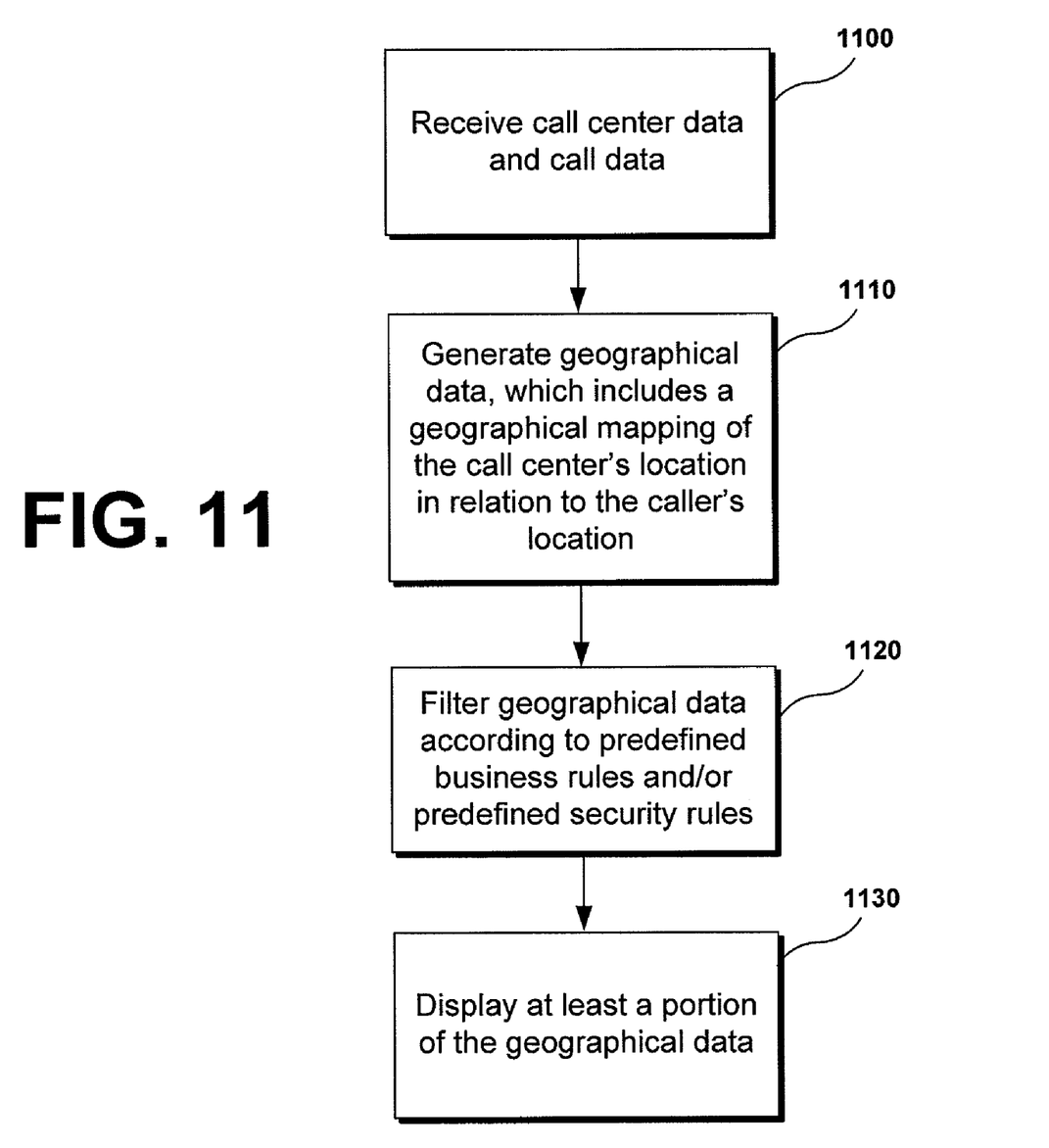
FIGS. 11 and 12 show exemplary steps performed by a geographical mapping system according to one embodiment.

Operatively, in one embodiment, the geographical mapping system 170 receives call data and call center data, e.g., mapping information 500, from the call or the call center system 130 (Step 1100). After receiving the call data and call center data, the mapping module 405 associates the call center data with the call data. That is, it generates the geographical data (Step 1110). As mentioned, the geographical data typically includes data associating the geographic locations of the callers in relation to the call centers. Additionally, the geographical data can also comprise other information from or generated from the call data and call center data, including the telephone number of the call, the length of the call, the location of the caller, the caller's account number, the location of the agent, location of the call center, the agents online, the agents offline, length of the call, or the like. Before, after, or simultaneous to the generation of geographical data, the call or geographical data can be filtered.

Filtering the calls or geographical data can be performed by the mapping module 405, security module 410, or both (Step 1120). Alternatively, in an embodiment implemented via a geographical mapping system 170 and a security system 140, filtering the calls can be performed by the geographical mapping system 170, the security analysis system 140, or both. Regardless, the filtering, which can be performed on a per-call basis or for multiple calls at once, is typically performed to determine the calls or geographical data that should be displayed by the geographical mapping system 170. After filtering the calls or geographical data, the geographical mapping system 170 typically displays at least a portion of the geographical data as shown in FIGS. 6-10, for example (Step 1130). And as discussed, the geographical data may include the status, activity, security, work-force, and other information of a call center or call.

Figure 12:
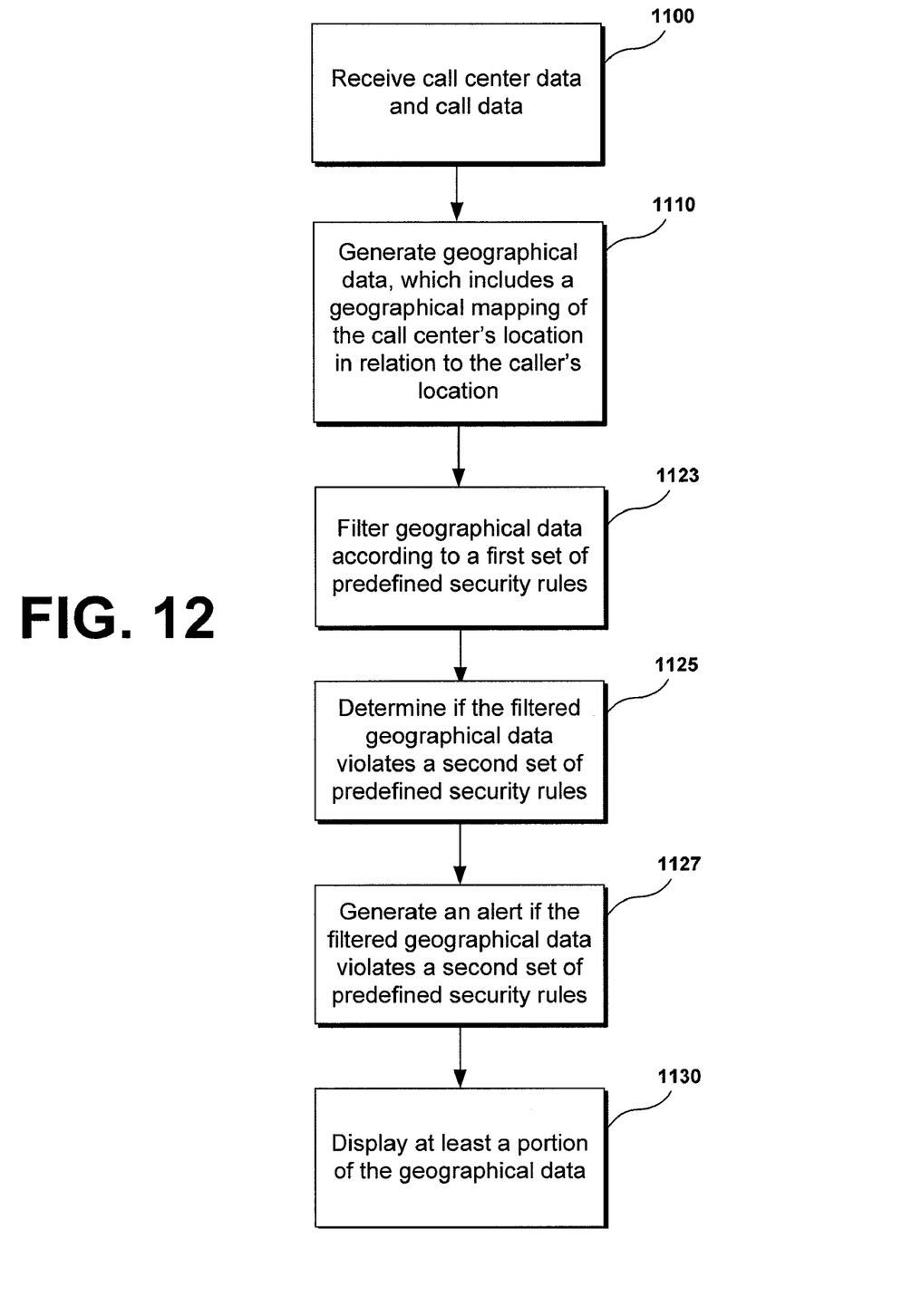

In another embodiment, shown in FIGS. 4 and 12, the geographical mapping system 170 receives mapping information 500 (e.g., call data and/or call center data) (Step 1100). After receiving the mapping information 500, the geographical mapping system 170 generates geographical data (Step 1110). The geographical mapping system 170 can then filter the calls or geographical data for compliance with a first set of predefined security rules (Step 1123). This filtering is typically performed to determine which calls or geographical data should be displayed by the geographical mapping system 170. After filtering the calls or geographical data according the first set of predefined security rules, the geographical mapping system 170 determines if any of the calls violate a second set of predefined security rules (Step 1125). As indicated, the first set of predefined security rules and the second set of predefined security rules can be comprised of wholly distinct rules, overlapping rules, or the same rules. This determination may be performed to establish if any of the filtered calls or geographical data require the geographical mapping system 170 to generate an alert for a given call (Step 1127). This may include generating an alert as previously discussed, such as sending a textual notice to a computer or mobile device, causing the geographic line to flash, and/or changing the color of a given line corresponding to a call center and a given call. And as mentioned, this can be performed simultaneously with the filtering and/or by using the same or multiple sets of predefined rules. After filtering the calls or geographical data and determining if an alert is required, the geographical mapping system 170 typically displays at least a portion of the geographical data, for instance, as shown in FIGS. 6-10 (Step 1130).

In the preceding specification, various embodiments have been described. It will, however, be evident that various modifications and changes may be made thereunto without departing from the broader spirit and scope of the embodiments as set forth in the claims that follow. The specification and drawings are accordingly to be regarded in an illustrative rather than in a restrictive sense.

That which is claimed:

1. A method for geographically mapping call center information, the method comprising:

receiving, by a device, call center data, where the call center data includes information associated with one or more call centers;

receiving, by the device, call data, where the call data includes information associated with one or more calls transmitted to the one or more call centers and information identifying one or more locations of one or more callers associated with the one or more calls;

associating, by the device, the call center data with the one or more calls and the call data with the one or more call centers to generate geographical data, where the geographical data includes:

a geographical mapping of a location of the one or more call centers relative to the locations of the one or more callers;

filtering, by the device, the geographical data based on a first set of rules to identify a portion of the geographical data for display;

filtering, by the device, the portion of the geographical data based on a second set of rules, where the second set of rules are different from the first set of rules;

generating, by the device, an alert based on filtering the portion of the geographical data, where the alert indicates that one of the one or more calls or one of the one or more call centers complies with the first set of rules and violates at least one of the second set of rules; and providing, for display and by the device, the portion of the geographical data and the alert based on the location of the one or more callers and the location of the one or more call centers.

2. The method of claim 1, where filtering the geographical data includes:

filtering the geographical data based on the first set of rules on a per-call basis for each of the one or more calls.

3. The method of claim 1, where generating the alert includes:

determining, based on filtering the portion of the geographical data, that the one or more calls violates at least one rule from the second set of rules;

generating a visual alert in response to determining that the one or more calls violates the at least one rule; and displaying the portion of the geographical data and the visual alert via a display associated with the device.

4. The method of claim 1, further comprising:

querying a memory associated with the device to determine at least one of the call data or the call center data.

5. The method of claim 1, where at least a portion of the call data is automatically received via a caller identification protocol.

6. The method of claim 1, further comprising:

defining characteristics associated with each of the one or more calls based on filtering the geographical data; and providing, for display, the portion of the geographical data based on the defined characteristics.

7. The method of claim 1, where generating the alert includes at least one of:

transmitting a textual notice to notify a user of the alert, generating an audible alert, or altering a display of information associated with the one of the one or more calls or a display of information associated with the one of the one or more call centers.

8. A system for geographically mapping call center information, the system comprising:

a processor to:

receive call center data, where the call center data includes information associated with a plurality of call centers, receive call data, where the call data includes information associated with a plurality of calls received by different ones of the plurality of call centers and information identifying locations of callers associated with the plurality of calls, associate the call center data with the plurality of calls and the call data with the plurality of call centers;

generate, based on the association of the call center data with the plurality of calls and the call data with the plurality of call centers, geographical data, where the geographical data includes a geographical mapping of locations of the call centers in relation to the locations of the callers, filter the geographical data based on the geographical mapping and a first set of rules to identify a portion of the geographical data to be presented for display, where the portion of the geographical data is associated with a group of call centers, of the plurality of call centers, and a group of calls, of the plurality of calls, filter the portion of the geographical data based on a second set of rules to identify a violation of one or more rules included in the second set of rules, where the second set of rules are different from the first set of rules, and generate an alert based on identifying the violation, where the alert is generated to indicate that at least one call center, of the group of call centers, or at least one call, of the group of calls, violates the one or more of the second set of rules; and a display to:

present the portion of the geographical data based on the location of the plurality of call centers and the location of the plurality of callers.

9. The system of claim 8, where, when generating the alert, the processor is further to:

generate a visual, and where the display is further to:

present the visual alert in conjunction with the portion of the geographical data.

10. The system of claim 8, where the first set of rule comprises a first set of predefined security rules and the second set of rules comprises a second set of predefined security rules, where the second set of predefined security rules comprises a sub-set of the first set of predefined security rules.

11. The system of claim 10, where the call information includes ticket information for each of the plurality of calls, and the processor is further to:

determine, based on the ticket information and filtering the portion of the geographical data, that the at least one call center or the at least one call violates at least one rule from the second set of predefined security rules.

12. The system of claim 8, further comprising:

a memory, and where the processor is further to query the memory to determine at least one of the call data or the call center data.

13. The system of claim 8, where the processor is further to:

define characteristics associated with each of the plurality of calls based on filtering the geographical data, and where the display is further to:

display the portion of the geographical data based on the defined characteristics.

14. A non-transitory computer-readable medium for storing instructions, the computer-readable medium comprising:

one or more instructions which, when executed by at least one processor, cause the at least one processor to receive call center data, where the call center data includes information associated with a plurality of call centers;

one or more instructions which, when executed by at least one processor, cause the at least one processor to receive call data, where the call data includes information associated with a plurality of calls received by different ones of the plurality of call centers and information identifying locations of callers associated with the plurality of calls;

one or more instructions which, when executed by at least one processor, cause the at least one processor to associate, based on the call center data and the call data, each of the plurality of calls with different ones of the plurality of call centers to generate geographical data, where the geographical data includes:

a geographical mapping of a location of the call centers in relation to the location of the caller;

one or more instructions which, when executed by at least one processor, cause the at least one processor to filter the geographical data based on the geographical mapping and a first set of rules to identify a portion of the geographical data, where the portion of the geographical data is associated with a group of call centers, of the plurality of call centers, and a group of calls, of the plurality of calls;

one or more instructions which, when executed by at least one processor, cause the at least one processor to filter the portion of the geographical data based on a second set of rules to determine a violation of one or more rules of the second set of rules; and one or more instructions which, when executed by at least one processor, cause the at least one processor to generate an alert based on determining the violation, where the alert is generated to indicate that at least one call center, of the group of call centers, or at least one call, of the group of calls, violates one or more rules of the second set of rules; and one or more instructions which, when executed by at least one processor, cause the at least one processor to provide, for display, the at least a portion of the geographical data, where the at least the portion of the geographical data presents the group of call centers or the group of calls based on the locations of the call centers and the locations of the callers.

15. The computer-readable medium of claim 14, where the one or more instructions to filter the geographical data includes:

one or more instructions to determine whether the portion of the geographical data complies with a first rule, of the first set of rules;

one or more instructions to determine, when the portion of the geographical data complies with the first rule, that the portion of the geographical data complies with the first set of rules; and one or more instructions to determine, when the portion of the geographical data does not comply with the first rule, whether the portion of the geographical data complies with a second rule of the first set of rules, where the second rule is different from the first rule.

16. The computer-readable medium of claim 14, further comprising:

one or more instructions to determine whether the portion of the geographical data violates a first rule of the second set of rules or whether the portion of the geographical data violates a second rule of the second set of rules, where the second rule is different than the first rule;

one or more instructions to determine that the portion of the geographical data complies with the second set of rules when the portion of the geographical data does not violate the first rule and the second rule; and one or more instructions to generate the alert in response to determining that the portion of the geographical data violates the first rule or the second rule.

17. The computer-readable medium of claim 14, where the first set of rules comprises a first set of predefined security rules and the second set of rules comprises a second set of predefined security rules, the computer-readable medium further comprising:

one or more instructions to determine, based on filtering the geographical data and filtering the portion of the geographical data, an alert level associated with each of the plurality of call calls; and one or more instructions to provide, for display, one or more of the plurality of calls associated with the portion of the geographical data based on the alert level associated with each of the one or more of the plurality of calls.

18. The computer-readable medium of claim 14, further comprising:

one or more instructions to query a database, stored in a memory associated with the processor, for at least one of the call data or the call center data.

19. The computer-readable medium of claim 14, where the one or more instructions to receive the call data includes:

one or more instructions to receive at least a portion of the call data automatically via a caller identification protocol.

20. The computer-readable medium of claim 14, where the one or more instructions to generate the alert includes at least one of:

one or more instructions to transmit a textual notice to notify a user of the alert, one or more instructions to generate an audible alert, or one or more instructions to alter a display of information associated with one of the group of calls or a display of information associated with one of the group of call centers.

* * * * *